(12) United States Patent
Ogawa

(10) Patent No.: US 6,830,338 B2
(45) Date of Patent: Dec. 14, 2004

(54) PROJECTOR AND OPTICAL DEVICE

(75) Inventor: Yasunori Ogawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/906,075

(22) Filed: Jul. 17, 2001

(65) Prior Publication Data

US 2002/0021416 A1 Feb. 21, 2002

(30) Foreign Application Priority Data

Jul. 17, 2000 (JP) .......................................... 2000-216100

(51) Int. Cl.[7] ......................... G03B 21/14; G03B 21/26; G03B 3/00; G03B 21/22
(52) U.S. Cl. ........................ 353/20; 353/30; 353/101; 353/119
(58) Field of Search .............................. 353/20, 30, 119, 353/100, 101, 122; 349/9, 58, 60

(56) References Cited

U.S. PATENT DOCUMENTS

| | | | |
|---|---|---|---|
| 5,653,522 A | * | 8/1997 | Loucks ........................ 353/122 |
| 6,312,130 B2 | * | 11/2001 | Haba et al. .................... 353/34 |
| RE38,084 E | * | 4/2003 | Hashizume et al. ......... 353/101 |
| 6,561,650 B2 | * | 5/2003 | Ito et al. ........................ 353/20 |
| 6,631,039 B2 | * | 10/2003 | Fujimori et al. ............. 359/819 |

FOREIGN PATENT DOCUMENTS

JP          A 8-304739          11/1996

* cited by examiner

*Primary Examiner*—David Gray
*Assistant Examiner*—Melissa J Koval
(74) *Attorney, Agent, or Firm*—Oliff & Berridge, PLC

(57) ABSTRACT

A projector includes a light source, a beam splitter for splitting a light irradiated from the light source into a plurality of partial light beams, a polarization converter for converting the light beam irradiated from the beam splitter into a predetermined linear polarization light beam, and a lens array for transmitting the plurality of partial light beams irradiated from the polarization converter to a light modulator, where the polarization converter and the lens array are integrated by a holding frame and are fixed to a fixing portion of a support, so that the polarization converter and the lens array can be attached to the fixing portion of the support while adjusting position of the integrated component relative to the fixing portion, thus reducing trouble for position adjustment.

24 Claims, 12 Drawing Sheets

PROJECTOR AND OPTICAL DEVICE

BACKGROUND OF THE INVENTION

1. Field of the Invention

The present invention relates to a projector. More specifically, it relates to a projector for modulating and, subsequently, for enlarging and projecting a light beam irradiated from a light source to form a projection image.

2. Description of Related Art

Recently, a projector has come to be used in various circumstances such as technical review meeting at research and development department etc. by enlarging and projecting a data of CAD/CAM/CAE (computer-aided design/ computer-aided manufacturing/computer-aided engineering), various seminars and training institutes and classroom lessons in audiovisual education, as well as company meeting and presentation on business trip. Further, the projector has come to be used for projecting medical images and data such as CT scanning (computed tomography scanning) and MRI (magnetic resonance imaging) to serve for studying remedies and medical guidance and for effectively staging exhibitions and events attracting a lot of people.

Since projectors are now used in such various environments, various performance and functions are required for projectors, which include light-weight compact model for improving portability, high-intensity model and high-definition model for improving quality of images and high-function model capable of being connected to various digital machines and mobile tools.

The projectors are expected to be used in wider areas, so that projectors with more values added are now intensely developed targeting new area for use.

The aforesaid projectors accommodate a plurality of optical components thereinside, and modulate, enlarge and project a light beam irradiated from a light source using the source using the optical components to form a projection image.

Such optical components includes a polarization converter for converting the light beam irradiated from a light source via a beam splitter such as a lens array into a predetermined linear polarization beam for improving light utilization efficiency and for eliminating various optical aberrations, and a lens array for transmitting a plurality of partial beam irradiated form the polarization converter to a light modulator such as liquid crystal panel and to superpose the light beam on a display area of the light modulator.

Such polarization converter and lens array are respectively fixed on a inner case supporting the elements at a predetermined position adjacent to the light source. In fixing the elements, the position of the polarization converter and lens array relative to optical axis of the light incident on these elements is adjusted.

However, since the polarization converter and the lens array have to be independently fixed to a dedicated fixing portion while adjusting position thereof relative to optical axis, optical axis adjustment is troublesome. Further, a lot of work is necessary for fixing the components, thus requiring a lot of time for assembling the projector.

Further, since two fixing portions for the polarization converter and lens array have to be provided on the inner case constituting the projector, the structure of the inner case becomes complicated. Especially, since the polarization converter and the lens array have to be very closely disposed, the fixing portion has to be provided closer, so that the structure of the inner case becomes further complicated.

SUMMARY OF THE INVENTION

An object of the present invention is to provide a projector capable of enhancing light utilization efficiency, facilitating optical axis adjustment between a polarization converter and a lens array to reduce trouble in securing work and simplifying a structure of a fixing portion of a support.

A projector according to an aspect of the present invention includes:

a light source for irradiating a light; a beam splitter for splitting the light irradiated from the light source into a plurality of partial light beams; a polarization converter for converting the light beam irradiated from the beam splitter into a predetermined linear polarized light; and a lens array including a matrix-shaped arrangement of a plurality of lenses for transmitting the plurality of partial light beams irradiated from the polarization converter to a light modulator, in which the polarization converter and the lens array are integrated and fixed to a fixing portion of a support for supporting the polarization converter and the lens array.

According to the above arrangement, since the polarization converter and the lens array are integrated with optical axis position thereof being adjusted, the polarization converter and the lens array can be attached to the fixing portion of the support only by adjusting fixing position thereof of the integrated unit. Accordingly, it is not necessary to independently adjust the respective positions of the polarization converter and the lens array in the optical axis before attachment as in the conventional arrangement, so that trouble for position adjustment can be reduced, thus facilitating attachment of the polarization converter and the lens array.

Since the polarization converter and the lens array are provided, light utilization efficiency can be enhanced. Further, since the integrated polarization converter and the lens array are attached to the fixing portion, only one fixing portion is necessary, thus simplifying the structure of the inner case.

In a projector of an aspect of the present invention, a fixing position of the integrated polarization converter and the lens array may preferably be adjustable relative to the fixing portion of the support.

According to the above arrangement, since the polarization converter and the lens array can be attached to the fixing portion while adjusting fixing position thereof, while maintaining relative position by setting positional relationship between the polarization converter and the lens array in advance, the optical axis can be easily adjusted thus fixing an appropriate position.

In a projector of an aspect of the present invention, the plurality of lenses constituting the lens array preferably correspond respectively to a disposition of a polarization separation film of the polarization converter.

Since the plurality of lenses corresponds to the disposition of the polarization separation film of the polarization converter, the partial light beam from the polarization converter can be securely condensed and transmitted to the liquid crystal device by the lens array, thus further enhancing light utilization efficiency.

In a projector of an aspect of the present invention, the polarization converter and the lens array may preferably be integrally fixed with a holding frame for holding the polarization converter and the lens array.

According to the above arrangement, since the polarization converter and the lens array are held by the holding frame, mutual optical position of the polarization converter and the lens array can be easily established only by attaching the polarization converter and the lens array to the holding frame. Further, since the polarization converter and the lens array are held by the holding frame, the polarization converter and the lens array can be protected against shock applied from the outside.

In a projector of an aspect of the present invention, a fixing position of the holding frame may preferably be adjustable relative to the fixing portion of the support.

Accordingly, since the position of the polarization converter and the lens array can be adjusted by holding the holding frame, it is not necessary to directly hold the polarization converter and the lens array, so that the surfaces thereof is not likely to be damaged or got dirty.

In a projector of an aspect of the present invention, a guide engaging portion for guiding the holding frame to the fixing portion of the support may preferably be provided to the holding frame.

Since the guide engaging portion is provided to the holding frame, the holding frame is guided by the guide engaging portion in securing the holding frame on the fixing portion, the holding frame can be easily fixed.

In a projector of an aspect of the present invention, a jig engagement portion engageable with a position-adjusting jig for adjusting a fixing position of the holding frame may preferably be provided.

By providing the jig engagement portion, the holding frame can be easily held by the jig always at a constant attitude, so that the position adjustment is further exactly conducted.

DETAILED DESCRIPTION OF PREFERRED EMBODIMENT(S)

An embodiment of the present invention will be described below with reference to attached drawings.

[1. Main Arrangement of Projector]

Figure 1:
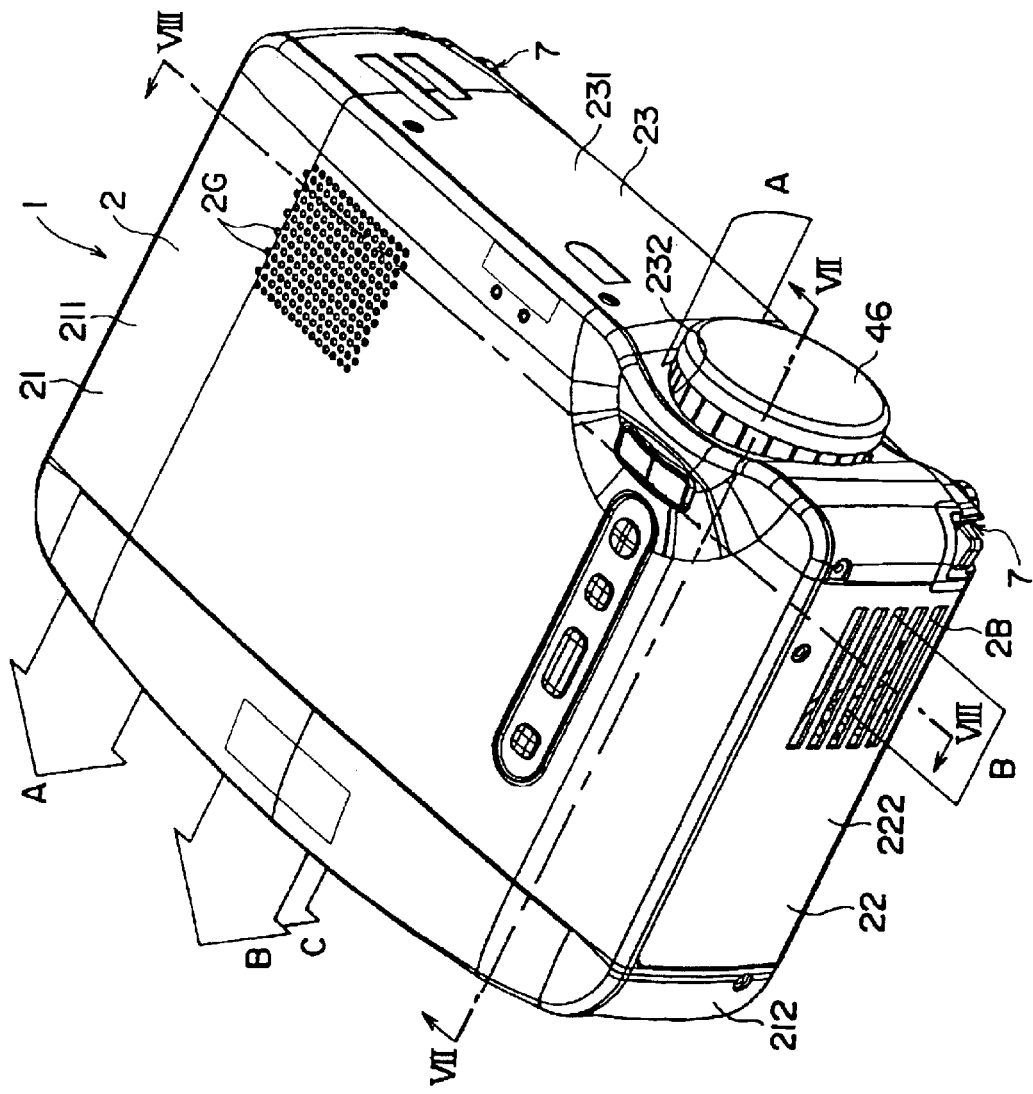
FIG. 1 is an entire perspective view from above showing a projector according to an embodiment of the present invention.
Figure 2:
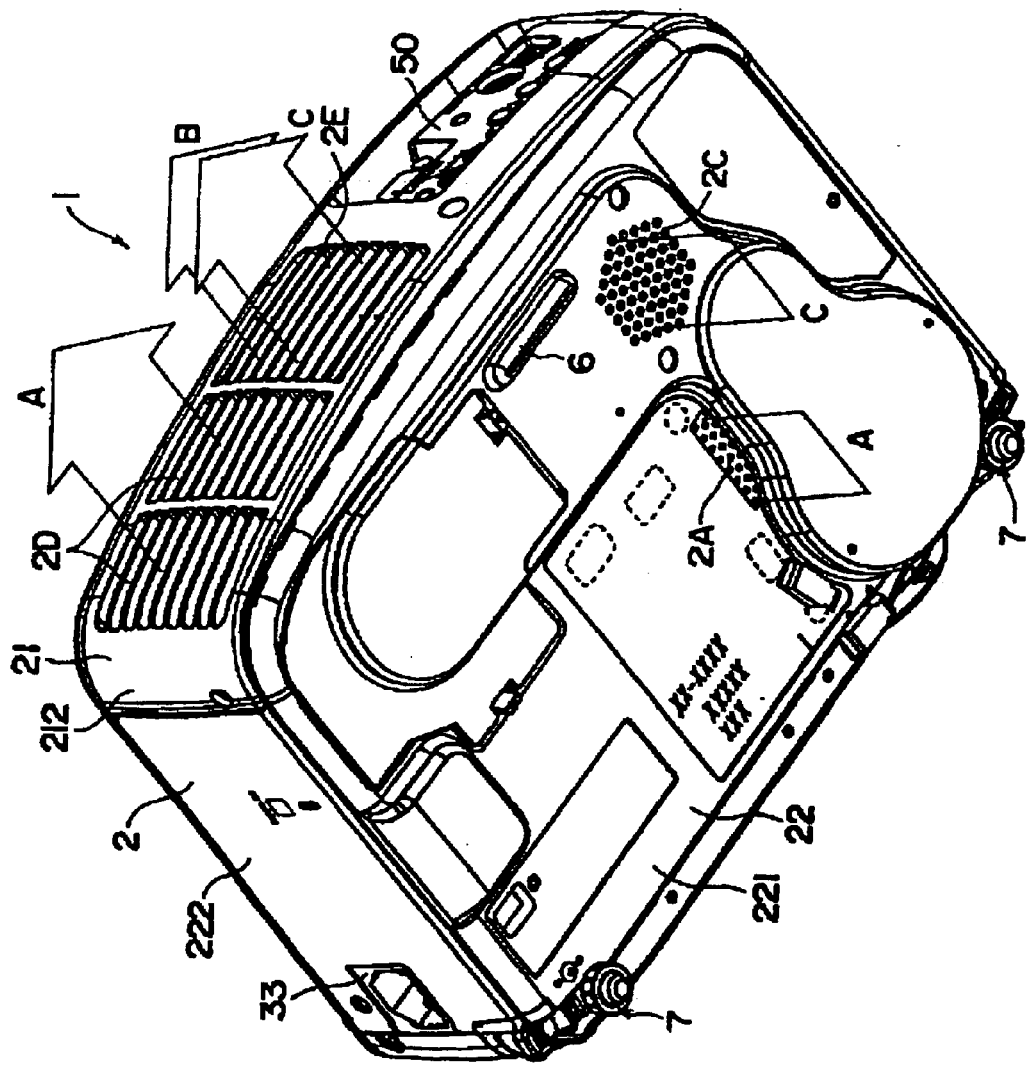
FIG. 2 is an entire perspective view from below showing the projector according to the aforesaid embodiment.
Figure 3:
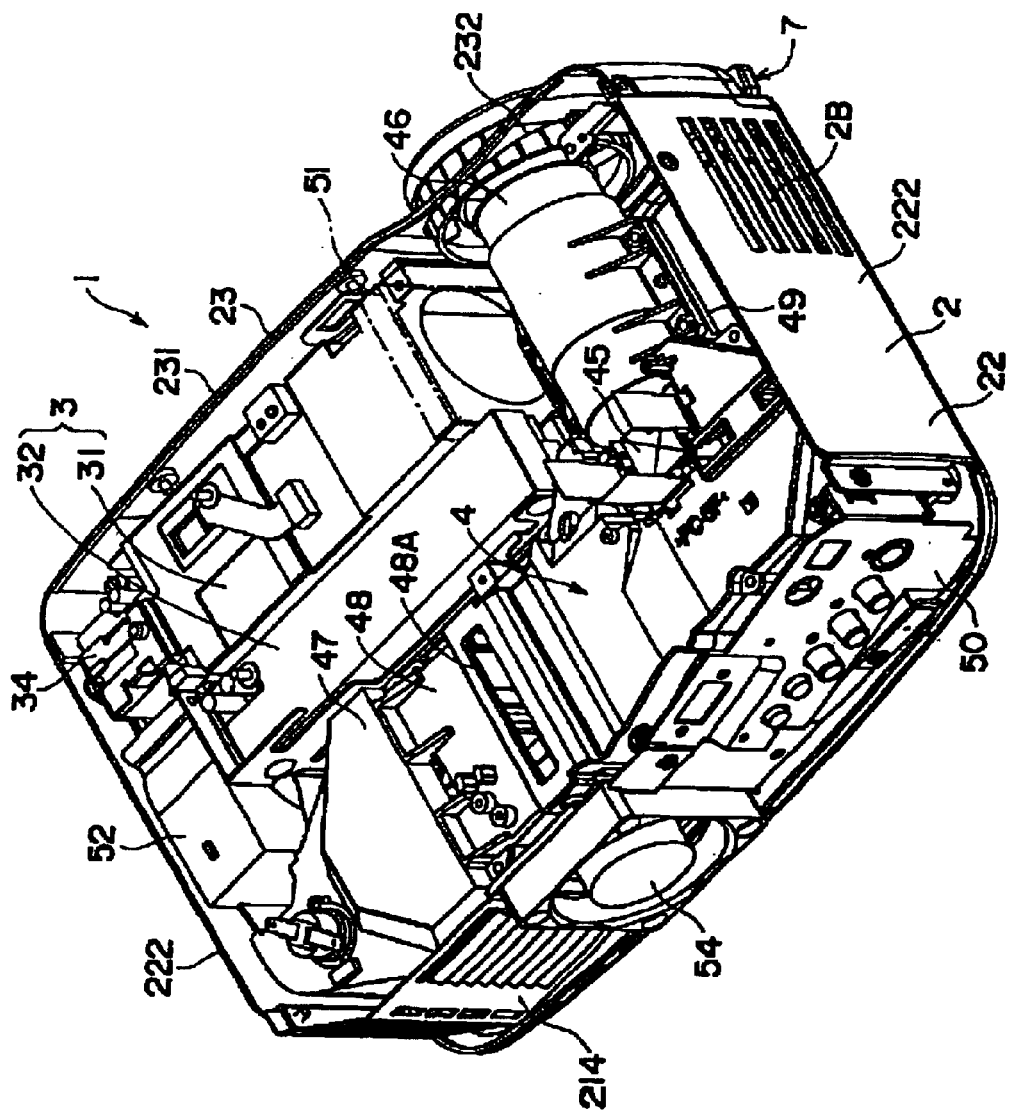
FIG. 3 is a perspective view showing an inside of the projector according to the aforesaid embodiment.

FIG. 1 is an overall perspective view of a projector 1 according to the present embodiment shown from above, FIG. 2 is an overall perspective view of the projector 1 according to the present embodiment shown from below, and FIG. 3 is a perspective view showing an inside of the projector 1.

In FIGS. 1 to 3, the projector 1 has an exterior case 2, a power supply unit 3 accommodated in the exterior case 2 and an optical unit 4 having L-shaped planar shape disposed in the exterior case 2.

Figure 4:
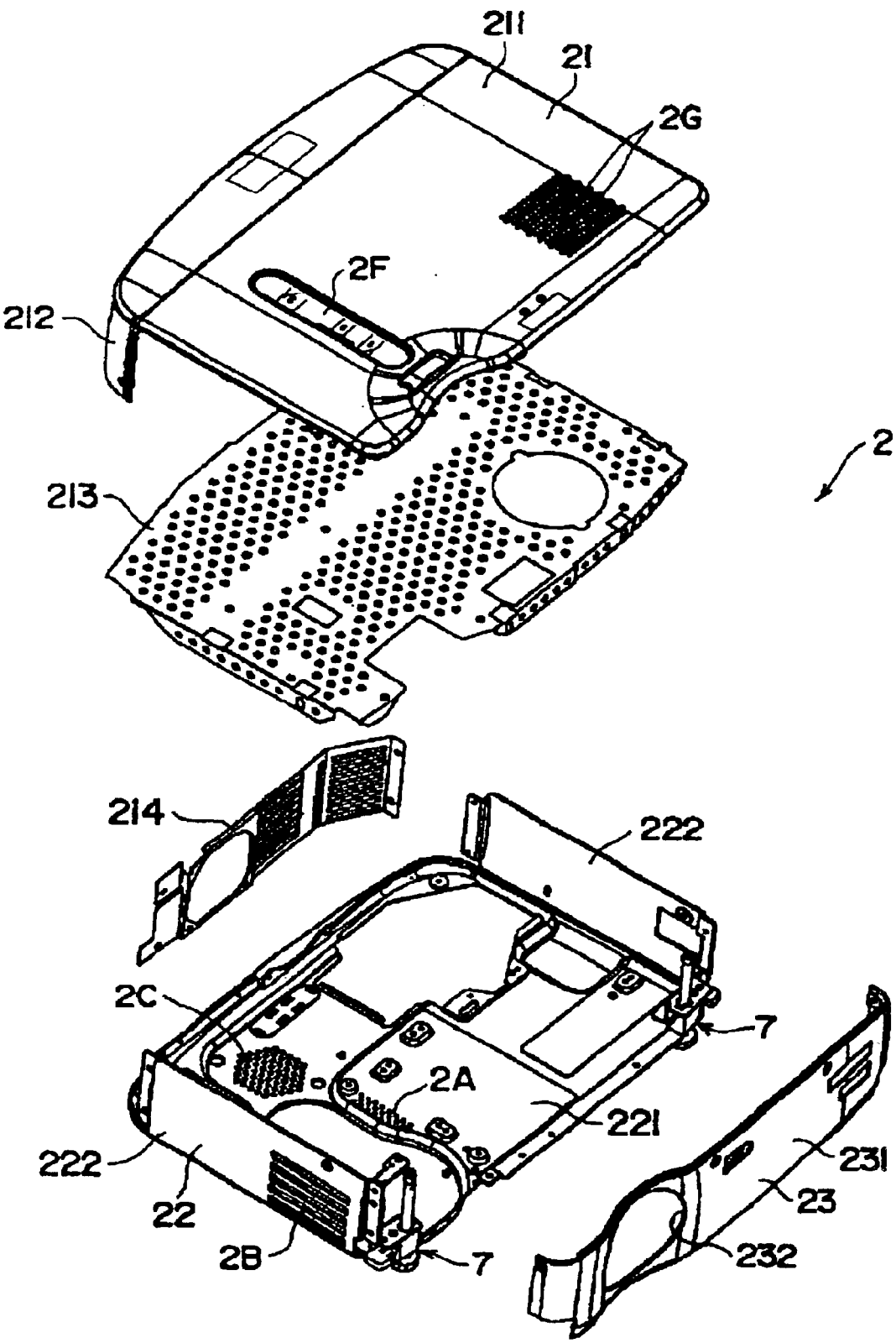
FIG. 4 is an exploded perspective view showing an exterior case of the aforesaid embodiment.

As shown in FIG. 4, the exterior case 2 is composed of a synthetic-resin made upper case 21, a lower case 22 made of metal such as aluminum, and a front case 23 made also of metal such as aluminum. The cases 21, 22 and 23 are screwed with each other.

The upper case 21 is formed by integrally molding an upper portion 211 and a rear portion 212.

A porous first electromagnetic shielding member 213 made by punching an aluminum plate is detachably provided on the inside of the upper portion 211. A second electromagnetic shielding member 214 made of aluminum plate is provided on the inside of the rear portion 212 of the upper case 21. The second electromagnetic shielding member 214 is screwed to the lower case 22.

The lower case 22 has a bottom portion 221 and a pair of opposing side portions 222 integrated with each other, which is formed by bending aluminum plates etc. of a predetermined shape punched by a press or a machining center so that the bottom portion 221 and the side portions 222 are mutually bent.

A height position adjuster 7 for adjusting an inclination of the entirety of the projector 1 for positioning a projected image is provided on both front corners of the bottom portion 221. On the other hand, only a resin-made foot member 6 (FIG. 2) is fitted to a rear center of the bottom portion 221.

The front case 23 constitutes a front portion 231 of the exterior case 2, which is also formed by bending or drawing a predetermined shape of aluminum plate processed by a press or a machining center. A circular opening 232 corresponding to a projection lens 46 is provided on the front case 23, a surrounding of the circular opening 232 being curved toward inside by drawing.

The exterior case 2 has inlets 2A, 2B and 2C for introducing cooling air thereinside and outlets 2D and 2E for discharging the cooling air from the inside as well as an operation panel 2F and multiple holes 2G corresponding to a position of a speaker. Various interface connectors are exposed on a rear side of the exterior case 2. A driver board for respective connectors being mounted and the other boards are supported by an aluminum plate 50 fixed to shut the rear opening. The aluminum plate 50 also works as an electromagnetic shielding plate.

The power supply unit 3 is composed of a main power supply 31 disposed on a front side inside the exterior case 2 (FIG. 3) and a ballast 32 disposed at the back of the main power supply 31. The main power supply 31 supplies electric power supplied through a power cable to the ballast 32 and the driver board (not shown). The main power supply includes an inlet connector 33 (FIG. 2), an aluminum frame 34 surrounding therearound (FIG. 3) and a power supply circuit (not shown) etc.

The ballast 32 supplies electric power mainly to a light source lamp 411 (FIG. 5) of the optical unit 4, which includes a lamp actuating circuit.

Figure 5:
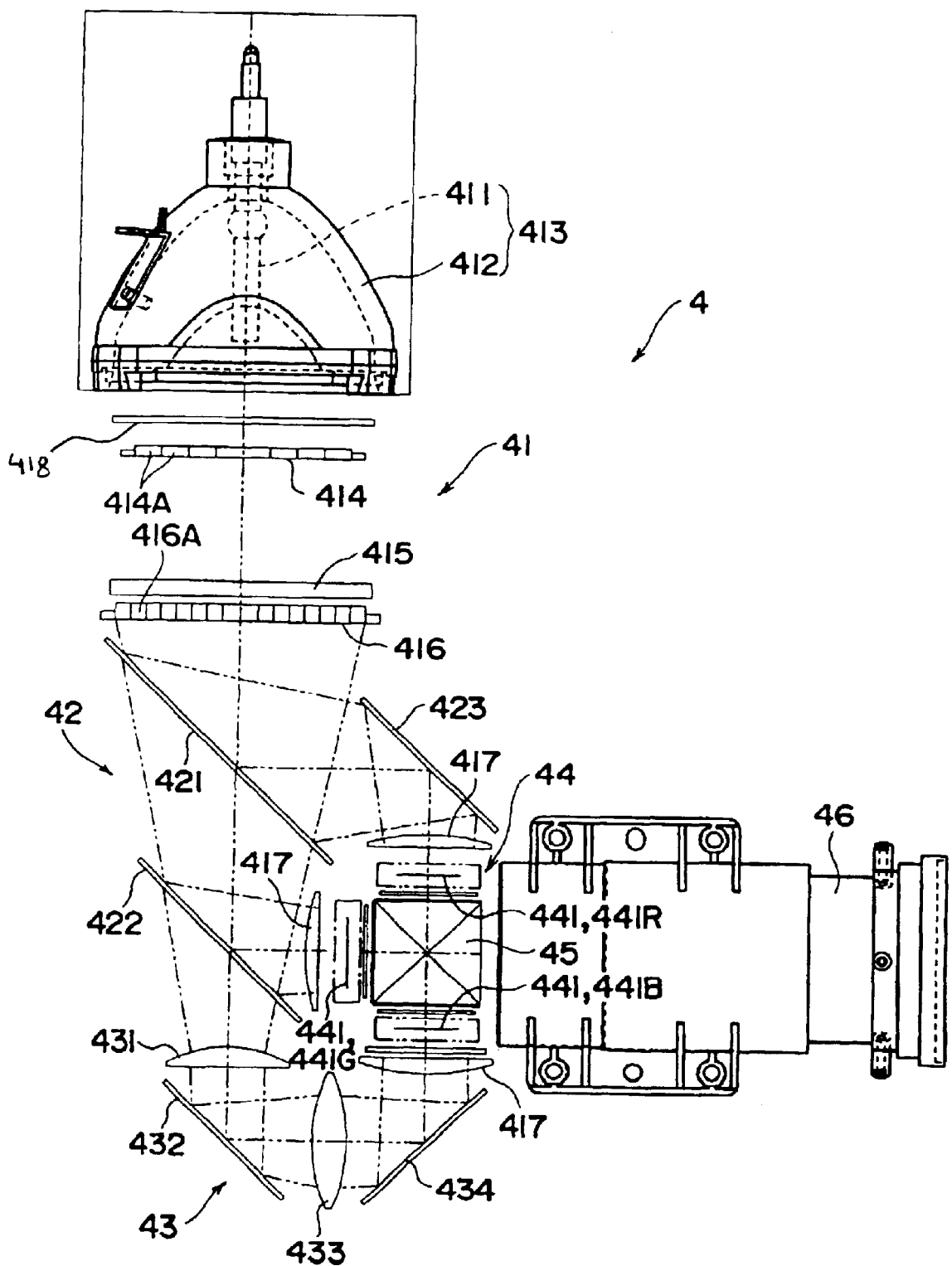
FIG. 5 is a plan view schematically showing respective optical systems of the projector according to the aforesaid embodiment.

As shown in FIG. 5, the optical unit 4 optically processes the beam irradiated from the light source lamp 411 to form an optical image corresponding to image information, which includes an integrator illumination optical system 41, a color-separation optical system 42, a relay optical system 43, an electric optical device 44, a cross dichroic prism 45 as a color-composite optical system, and a projection lens 46 as a projection optical system.

[Detailed Arrangement of Optical System]

In FIG. 5, the integrator illumination optical system 41 is an optical system for substantially uniformly illuminating an image formation area of three liquid crystal panels 441 (shown as liquid crystal panel 441R, 441G, and 441B for each color light) constituting the electric optical device 44, which includes a light source 413, a UV filter 418, a first lens array 414 as a beam splitter, a polarization converter 415 and a second lens array 416. Incidentally, the polarization converter 415 and the second lens array 416 are the optical components according to the present invention.

The light source 413 constituting the integrator illumination optical system 41 has the light source lamp 411 as an irradiation light source for irradiating radiation light, and a reflector 412 for reflecting the radiation light irradiated from the light source lamp 411. A halogen lamp, metal halide lamp or a high pressure mercury-vapor lamp is often used as the light source lamp 411. An ellipsoid mirror may preferably be used as the reflector 412.

The first lens array 414 has a matrix-shape array of lens 414A having approximately rectangular contour. Each of the lens 414A divides the light beam irradiated from the light light source lamp 411 passing the UV filter 418 into a plurality of partial light beam. The contour of respective lens is arranged to be a figure approximately similar to the image formation area of the liquid crystal panel 441. For instance, when the aspect ratio (ratio of horizontal and vertical dimension) of the image formation area of the liquid crystal panel 441 is 4:3, then the aspect ratio of each of the lens 414A is set as 4:3.

The second lens array 416 is arranged substantially the same as the first lens array 414, where the lens 416A is arrayed in a matrix. The second lens array 416 condenses the light from the first lens array 414.

The polarization converter 415 is disposed between the first lens array 414 and the second lens array 416, which converts the light from the first lens array 414 into single type polarized light, thereby improving light utilization efficiency of the electric optical device 44. Specifically, the respective partial light beam converted into the single type polarized light by the polarization converter 415 is condensed onto a condenser 417 and is finally substantially superposed on the liquid crystal panel 441R, 441G and 441B of the electric optical device 44. Since the projector 1 (the electric optical device 44) of the present embodiment using the liquid crystal panel 441 for modulating the polarized light can use only the single type polarized light, approximately half of the light from the light light source lamp 411 irradiating other random polarized light cannot be used. The polarization converter 415 is used to convert all of the irradiation light from the light light source lamp 411 to the single type polarized light, thus enhancing light utilization efficiency of the electric optical device 44. Incidentally, such polarization converter 415 is shown in, for instance, Japanese Patent Laid-Open Publication No. Hei-8-304739.

The color-separation optical system 42 includes two dichroic mirror 421 and 422 and a reflection mirror 423, which separates a plurality of partial light beam irradiated from the integrator illumination optical system 41 into three color lights of red, green and blue by the mirrors 421 and 422.

The relay optical system 43 includes an incident-side lens 431, relay lens 433 and reflection mirrors 432 and 434, which guides the color lights, i.e. the blue light to the liquid crystal panel 441B. Incidentally, the relay lens 433 is also the optical component of the present invention.

The electric optical device 44 includes liquid crystal panels 441R, 441G and 441B as three light modulators, which uses, for instance, polysilicon TFT as a switching element. The respective color lights separated by the color-separation optical system 42 are modulated by the three liquid crystal panels 441R, 441G and 441B in accordance with image information thus forming an optical image.

The cross dichroic prism 45 forms a color image by composing the image modulated for each color lights irradiated from the three liquid crystal panels 441R, 441G and 441B. Incidentally, dielectric multilayered film for reflecting red light and dielectric multilayered film for reflecting blue light are formed in the prism 45 in approximately X-shape along boundary of four right-angle prisms, where three color lights are composed by the dielectric multilayered films. The color image composed by the prism 45 is irradiated from the projection lens 46 to be enlarged and projected onto a screen.

Figure 6:
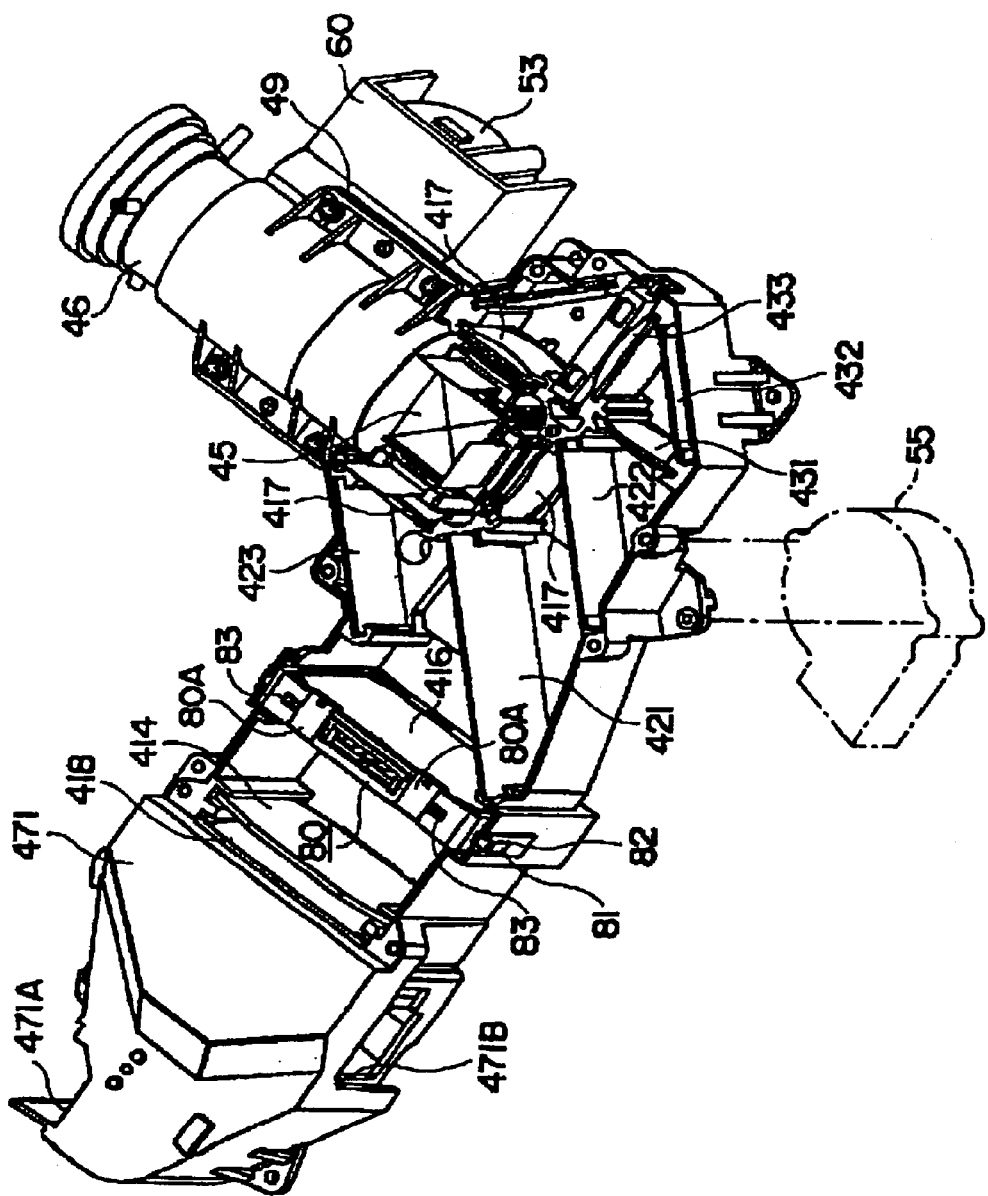
FIG. 6 is a perspective view showing components of an optical unit of the projector according to the aforesaid embodiment.

The above-described respective optical systems 41 to 45 are, as shown in FIG. 6, accommodated in a synthetic-resin made inner case 47. The inner case 47 has a light source protector 471 for covering the light source 413 as well as a groove for fitting the aforesaid respective optical components 414, 417, 418, 421 to 423, and 431 to 434 slidably from the above. A cover 48 shown in FIG. 3 is attached to the inner case 47.

Incidentally, attachment of the integrally unitized polarization converter 415 and the second lens array 416 as an optical component of the present invention to the inner case 47 will be described below.

A head 49 is formed on a light irradiation side of the inner case 47. The prism 45 attached with the liquid crystal panels 441R, 441G and 441B is fixed to an end of the head 49 and a projection lens 46 is fixed on a fringe along the semi-cylinder portion of the other end.

[3. Cooling System]

As shown in FIGS. 1 to 3, a first cooling system A for discharging cooling air inhaled from the side of the projector lens 46 and the inlet 2A at the bottom of the exterior case 2 from the outlet 2D, a second cooling system B for discharging cooling air inhaled from the inlet 2B provided on the side of the exterior case 2 from the outlet 2E, and a third cooling system C for discharging cooling air inhaled from the inlet 2C provided at the bottom of the exterior case 2 from the outlet 2E are formed in the projector 1.

In the first cooling system A, an axial flow intake fan 51 (shown in single dotted line in FIG. 3) is provided on the side of the projector lens 46 of the main power supply 31 and a first sirocco fan 52 is provided on the side of the light source 413 of the ballast 32.

The cooling air inhaled from the side of the projector lens 46 and the inlet 2A by the axial flow intake fan 51 flows toward and is inhaled by the sirocco fan 52 while cooling the main power supply 31 and the ballast 32. The cooling air discharged from the first sirocco fan 52 enters into the light source protector 471 from an intake notch 471A provided to the inner case 47 to cool the light source 413 from the back thereof, is discharged from an exhaust notch 471B (FIG. 6) and is exhausted from the outlet 2D to the outside of the exterior case 2.

Figure 7:
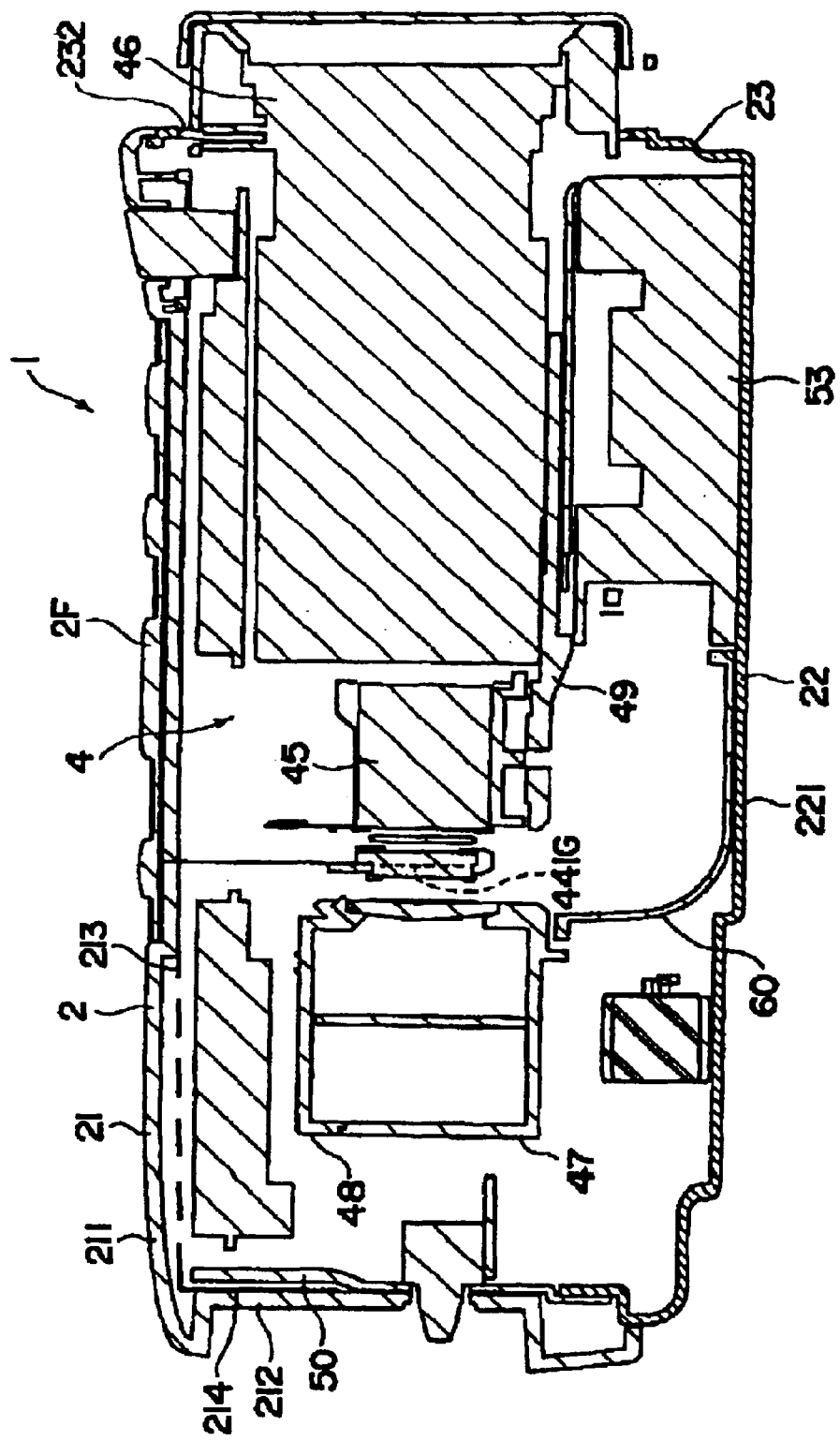
FIG. 7 is a cross section taken along VII—VII line in FIG. 1.
Figure 8:
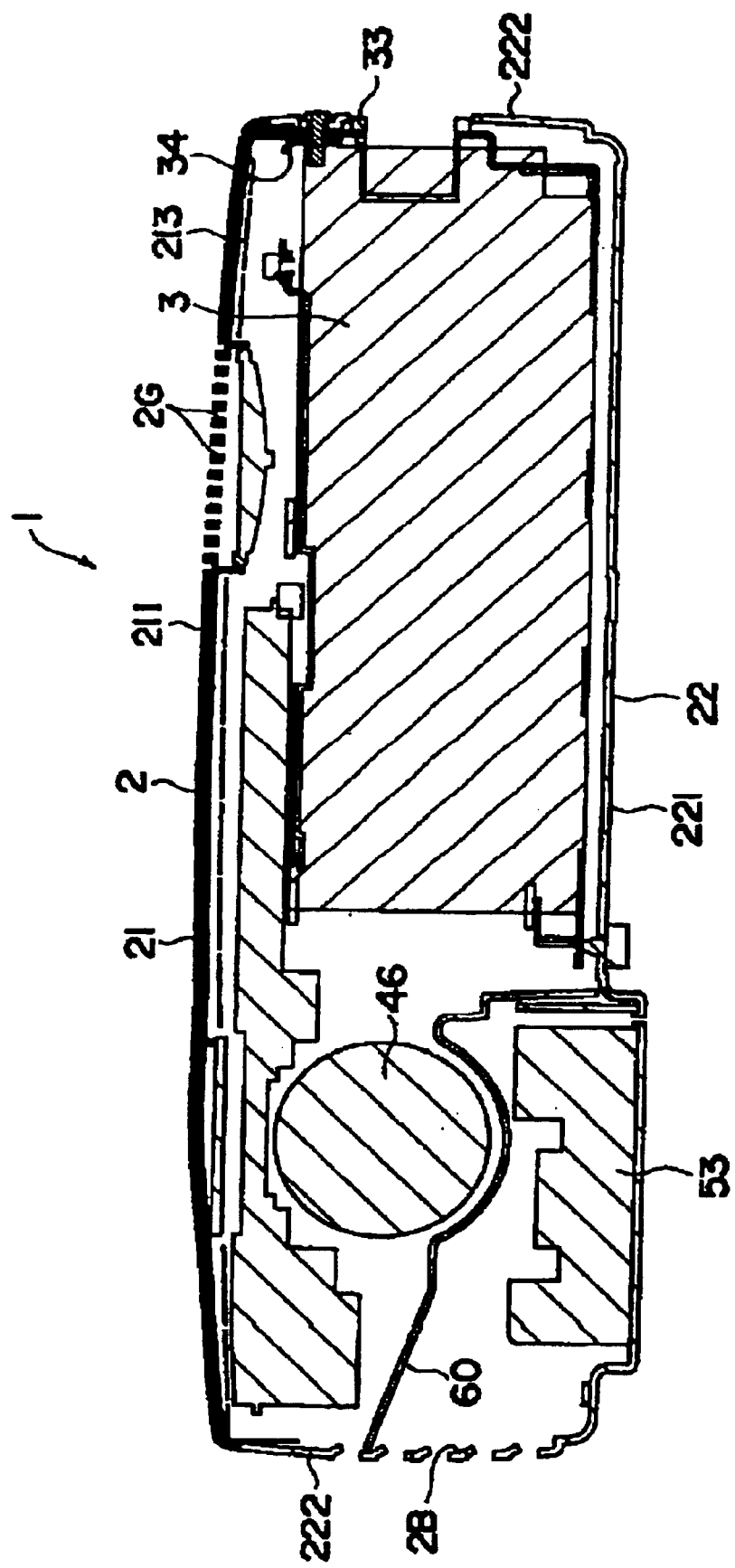
FIG. 8 is a cross section taken along VIII—VIII line in FIG. 1.

In the second cooling system B, as shown in cross section of FIGS. 7 and 8, a second sirocco fan 53 is provided under the projector lens 46. The second sirocco fan 53 is disposed at an intermediary of a duct member 60 (FIG. 6) for introducing the cooling air from the inlet 2B to the lower side of the electric optical device 44.

The suction air inhaled from the inlet 2B is sucked into the second sirocco fan 53 by being introduced by the duct member 60, and, after being discharged along the bottom of the exterior case 2, cools the electric optical device 44. Subsequently, the cooling air flows toward an axial flow exhaust fan 54 on the rear side while cooling the driver board (not shown), and is discharged from the outlet 2E by the exhaust fan 54.

In the third cooling system C, as shown in single dotted line in FIG. 6, a third sirocco fan 55 is provided to a position corresponding to the inlet 2C (FIG. 2, FIG. 4) at the bottom of the exterior case 2 under the inner case 47. Respective holes of the inlet 2C have diameter as small as possible for preventing inhalation of dust on the place where the projector 1 is installed.

After the cooling air inhaled from the inlet 2C to the third sirocco fan 55 is discharged to the light source 413 through a duct-shape portion formed between the bottom of the exterior case 2 and the lower side of the inner case 47, the cooling air is introduced to an inlet opening 47A provided corresponding to a position where the integrator illumination optical system 41 of the inner case 47 is provided, thereby cooling the UV filter 418 as well as the unit composed of the first lens array 414, the polarization converter 415 and the second lens array 416 constituting the integrator illumination optical system 41 from lower side to the upper side. Subsequently, the cooling air is discharged from the exhaust opening 48A (FIG. 3) of the cover 48 and is finally discharged from the outlet 2E by the axial flow exhaust fan 54 on the rear side. ps [4. Unit Integrating Polarization converter and Second Lens Array and Attachment Mechanism Thereof]

Figure 9:
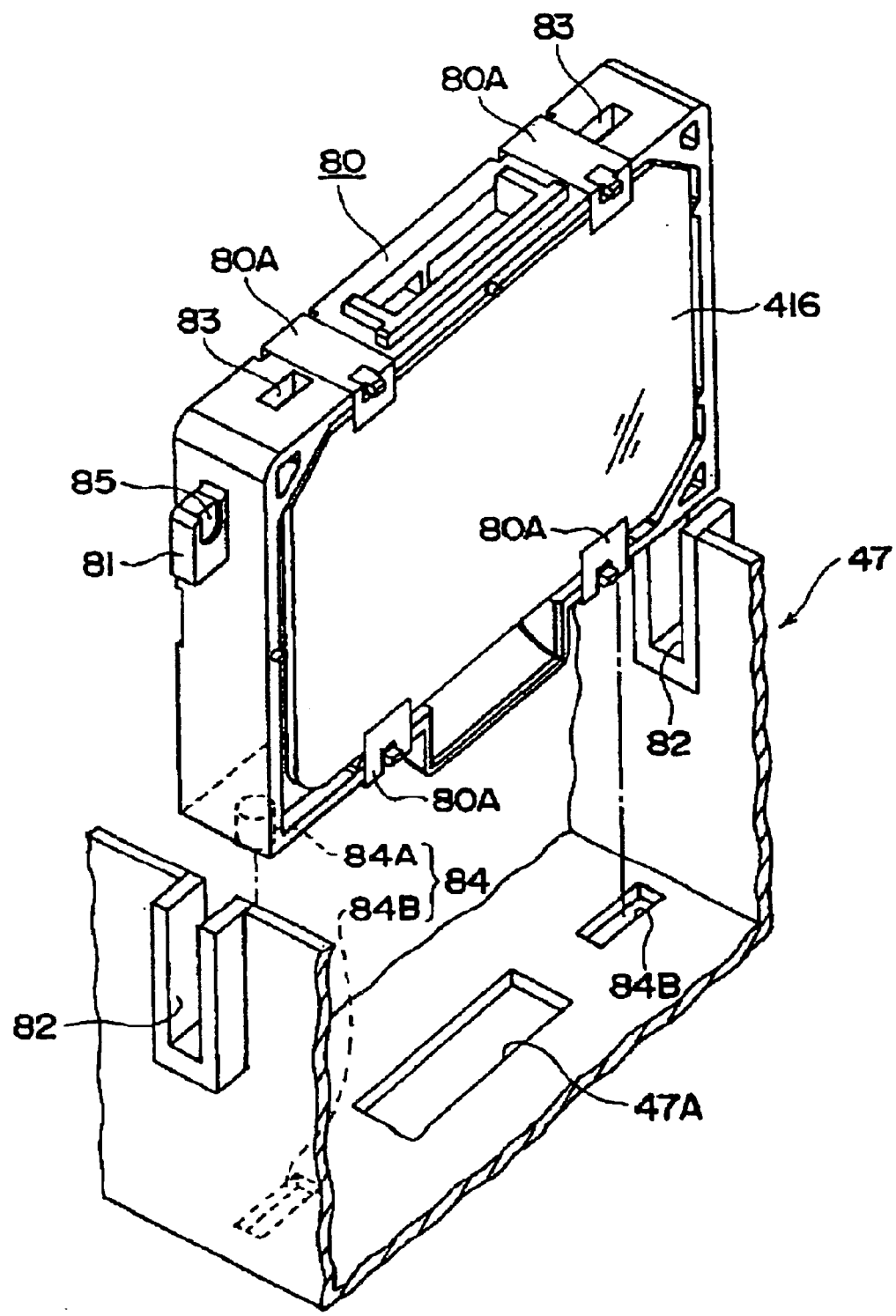
FIG. 9 is a perspective view showing a polarization converter and a second lens array of the optical unit of the aforesaid embodiment integrally held to a holding frame and the unit to be attached to a fixing portion.
Figure 10:
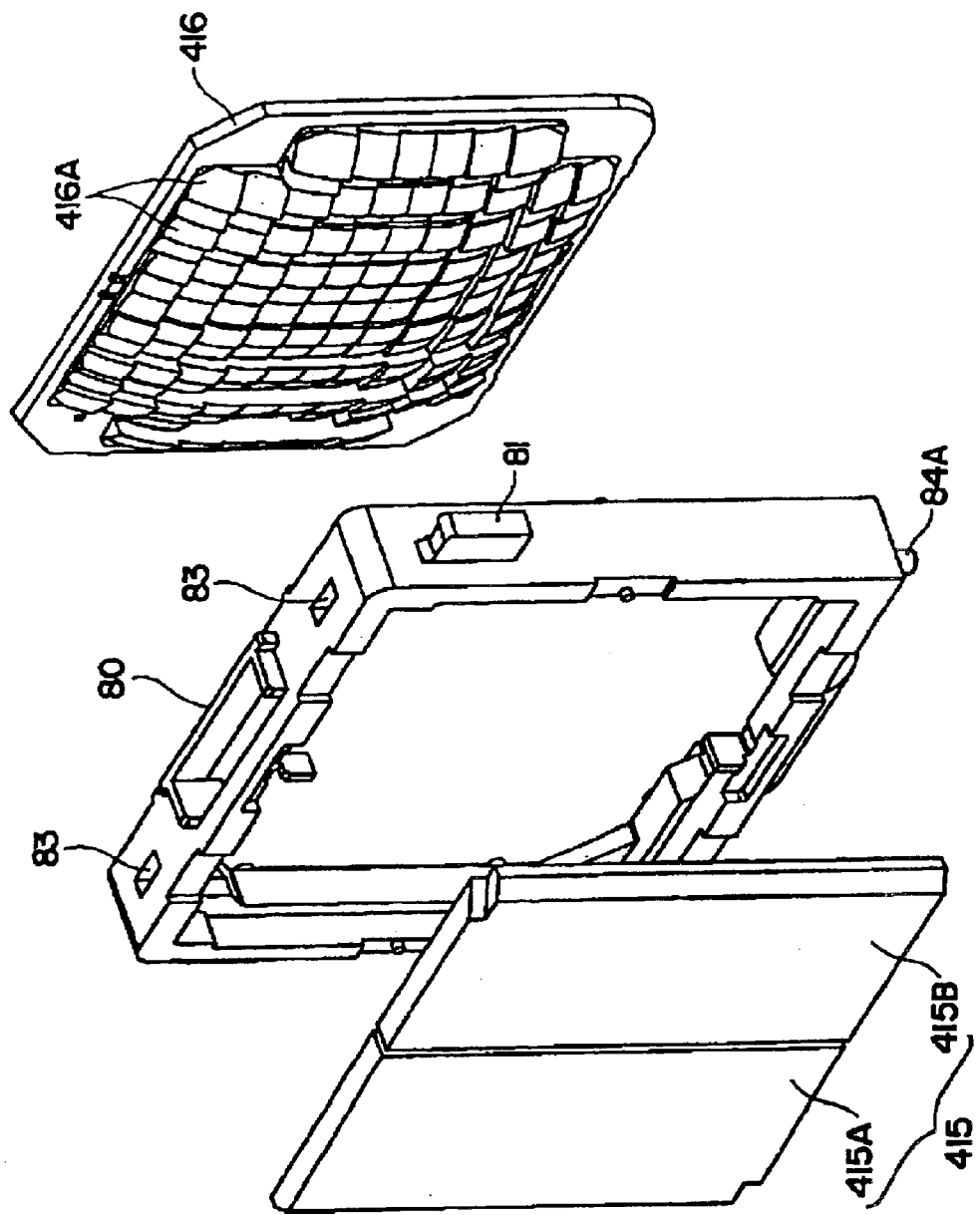
FIG. 10 is an exploded perspective view showing a relationship of the polarization converter, the second lens array and the holding frame of the optical unit of the aforesaid embodiment.
Figure 11:
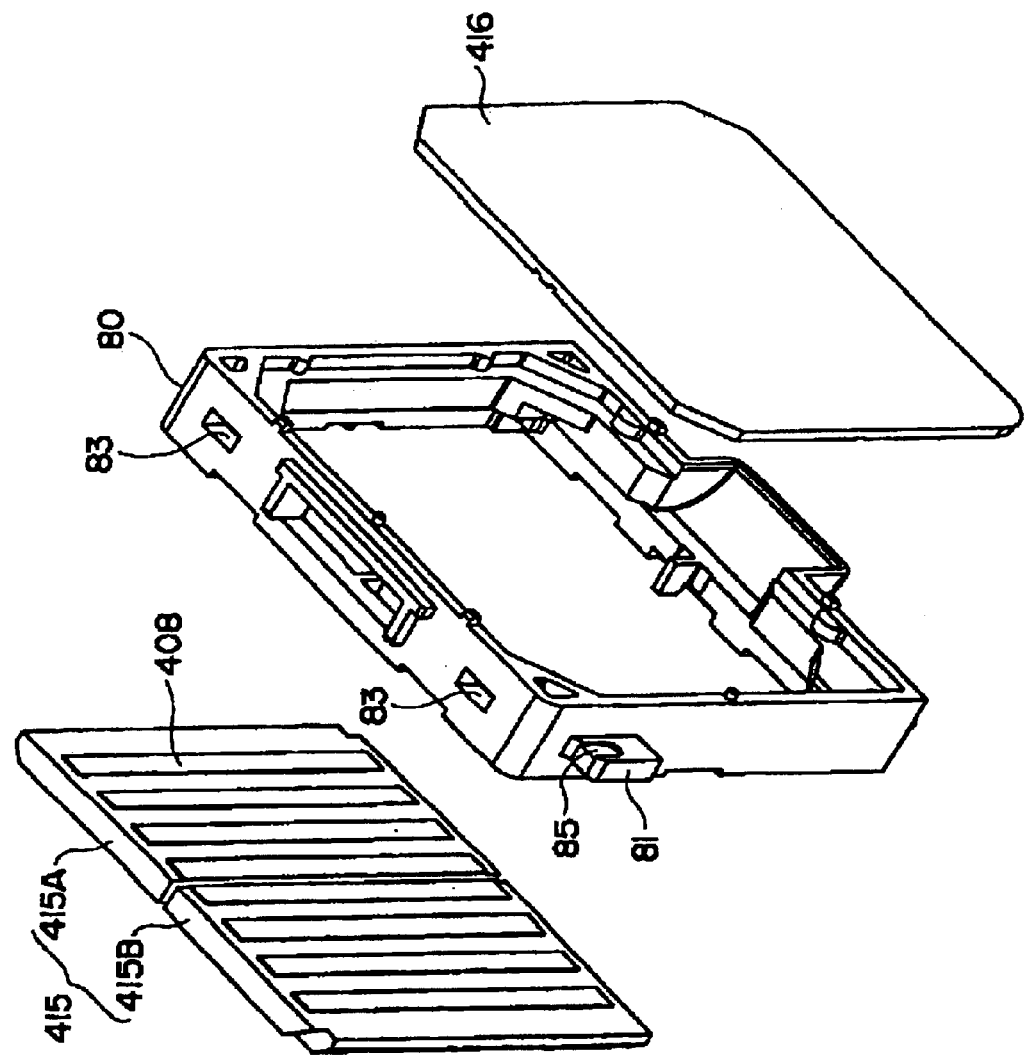
FIG. 11 is another exploded perspective view illustrated in other direction than FIG. 10 showing a relationship of the polarization converter, the second lens array and the holding frame of the optical unit of the aforesaid embodiment.

As shown in FIGS. 10 and 11, the polarization converter 415 and the second lens array 416 constituting the lens array are integrated by being held by a holding frame 80 while opposing with each other. FIG. 9 shows the holding frame is secured to a fixing portion 82 of the inner case 47 as a support body.

Figure 12:
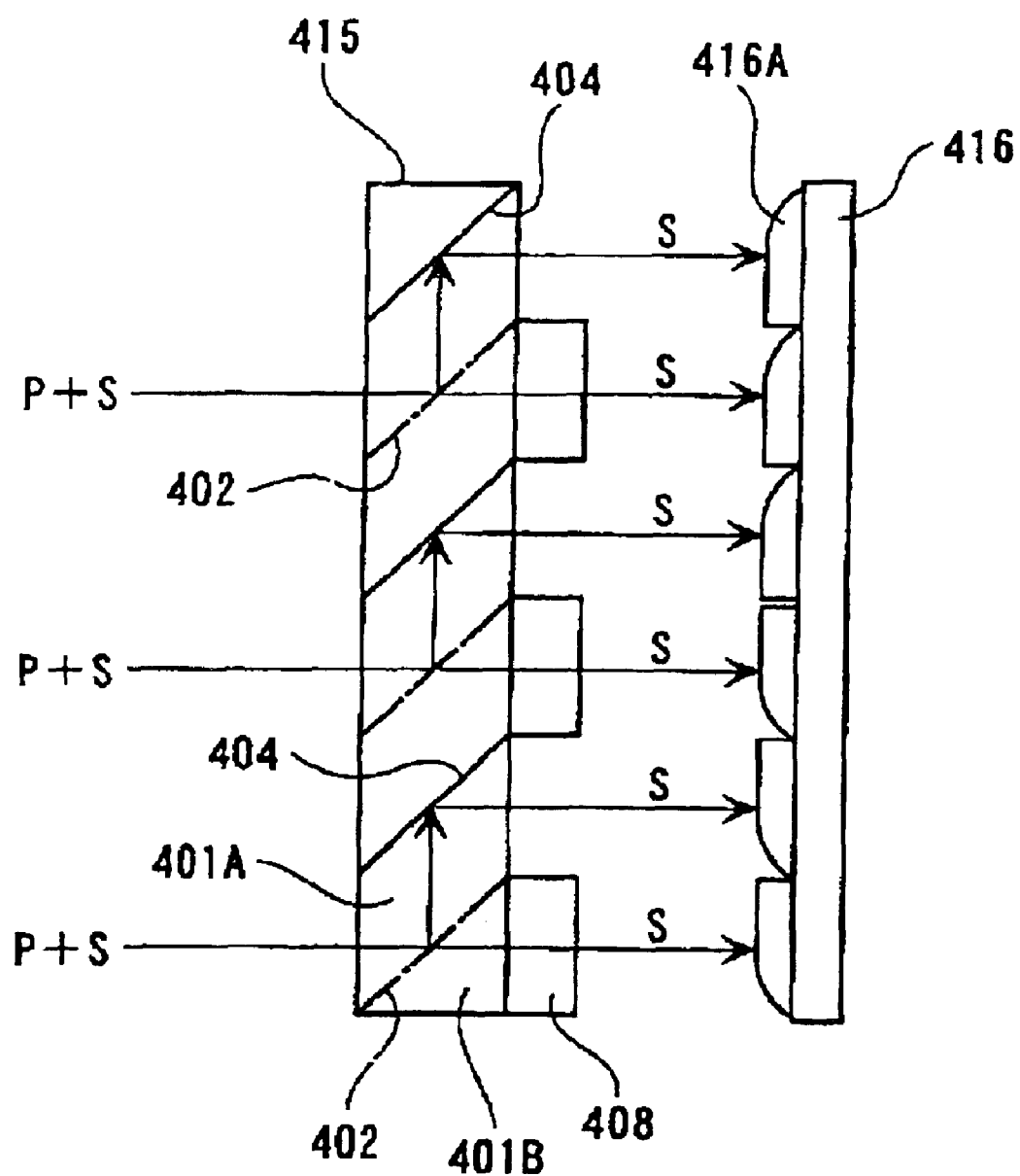
FIG. 12 is a cross section showing a correspondence between the polarization converter and the second lens array of the optical unit of the aforesaid embodiment.

The polarization converter 415 is composed of two elements, i.e. first element 415A and second element 415B. As shown in FIG. 12, the respective elements 415A and 415B include a plurality of light transmissive members 401A and 401B a plurality of polarization separation films 402 and reflection films 404 alternately disposed between the light transmissive members 401A and 401B and a retardation plate 408 provided to a position corresponding to the polarization separation film 402 to rotate the polarization direction.

The second lens array 416 has a matrix-shaped arrangement of a plurality of lenses 416A, the plurality of lenses 416A being disposed corresponding to a disposition of polarization separation film 402 of the polarization converter 415.

When, for instance, P polarization beam and S polarization beam enter the polarization converter 415, the S polarization beam is reflected by the polarization converting film 402 to be bent for approximately 90 degrees, reflected by the reflection film 404 and irradiated onto the lens 416A of the second lens array 416. The P polarization beam is irradiated onto the lens 416A of the second lens array 416 after the polarization direction of the P polarization beam is made approximately consistent with the polarization direction of the S polarization beam by transmitting through the polarization separation film 402 and passing through the retardation plate 408, thereby enhancing light utilization efficiency.

As shown in FIGS. 9–10, the holding frame 80 has a rectangular frame shape, where the polarization converter 415 and the second lens array 416 are attached to the holding frame 80 while being opposing with each other and with respective peripheries being fitted in the frame of the holding frame. The polarization converter 415 and the second lens array 416 are integrated by fastening two upper peripheral portions and two lower peripheral portions with four clips 80A. The mutual optical position of the polarization converter 415 and the second lens array 416 is correctly set while being integrated.

A guide engaging portion 81 for guiding the holding frame 80 into the fixing portion 82 of the inner case 47 in a loosely fitted manner is provided on both right and left ends of the holding frame 80. An adhesive filling groove 85 for adhesive to be filled in is formed on the guide engaging portion 81.

A jig attachment hole 83 as an engaging portion of a jig is formed on an upper end of the holding frame 80, where a jig (not shown) can be engaged by, for instance, being inserted from above.

A regulator 84 for defining an attitude of the second lens array 416 in the optical axis direction is provided on a lower end of the holding frame 80 and an upper side of the inner case 47 opposite to the lower end. The regulator 84 is composed of a cylindrical projection 84A provided to the lower end of the holding frame 80 and an engaging hole 84B penetrating the inner case 47 for the projection 84A to be engaged.

The engaging hole 84B elongates in a direction orthogonal with the optical axis direction of the second lens array 416 and has a dimension along a direction orthogonal with the longitudinal direction thereof (width direction) substantially the same as a diametral dimension of the diameter of the projection 84A. Accordingly, the holding frame 80 is movable only in a direction along a surface orthogonal with the optical surface relative to the inner case 47 and is not movable in the optical axis direction. By inserting the projection 84A into the engaging hole 84B, the holding frame 80 can be prevented from falling in the optical axis direction.

[5. Effects of Embodiment]

According to the above-described embodiment, following effects can be obtained.

(1) Since the polarization converter 415 and the second lens array 416 are held and integrated by the holding frame 80 and the holding frame 80 is attached to the inner case 47 after adjusting the optical axis, it is not necessary to independently adjust the respective positions of the polarization converter and the second lens array in the optical axis before attachment as in the conventional arrangement. Accordingly, trouble for position adjustment can be reduced, thus facilitating attachment of the polarization converter 415 and the second lens array 416.

(2) Since the polarization converter 415 and the second lens array 416 are held by the single holding frame 80 and is position-adjusted relative to the inner case 47 by moving the holding frame 80, the position of the polarization converter 415 and the second lens array 416 relative to the inner case 47 can be adjusted while maintaining positional relationship between the polarization converter 415 and the second lens array 416 which require strict positioning. Accordingly, the optical axis can be easily adjusted and adjustment accuracy can be improved.

(3) Since the polarization converter 415 and the second lens array 416 are integrally secured by being held by the holding frame 80, the polarization converter and the second lens array can be more easily handled than separate arrangement thereof.

(4) Since the polarization converter 415 and the second lens array 416 are integrated by being held with the holding frame 80, the holding frame 80 can work as a cushioning against a shock applied from the outside, thus preventing damage.

(5) Since the polarization converter 415 and the second lens array 416 are held by the holding frame 80 to be integrally secured and the holding frame 80 is attached to the fixing portion 82 of the inner case 47, only one fixing portion 82 of the inner case 47 is required. Accordingly, the structure of the inner case can be simplified.

(6) Since the projector 1 includes the polarization converter 415 and the second lens array 416 and the plurality of lenses 416A of the second lens array 416 corresponds to the disposition of the polarization separation film 402 of the polarization converter 415, the partial beam from the polarization converter 415 can be securely condensed by the second lens array 416 and transmitted to the liquid crystal device, thus enhancing light utilization efficiency.

(7) Since the guide engaging portion 81 is provided on both right and left sides of the holding frame 80 and the holding frame 80 is guided by the guide engaging portion 81 when the holding frame 80 is secured to the fixing portion 82 of the inner case 47, the attachment work of the holding frame 80 can be facilitated.

(8) Since the jig attachment hole 83 is formed on the upper portion of the holding frame 80 and the position of the holding frame 80 can be adjusted by engaging a jig to the jig attachment hole 83, the holding frame 80 can be always easily held at a constant attitude, thus more accurately conducting position adjustment.

(9) Since the adhesive filling groove 85 is formed on the guide engaging portion 81 of the holding frame 80, the adhesive can be prevented from easily flowing out of a space between the holding frame 80 and the inner case 47 by filling the adhesive filling groove with the adhesive in fixing the holding frame 80 and the inner case 47, thus securing adhesion and fixing.

[6. Other Embodiment]

Incidentally, the scope of the present invention is not restricted to the above-described embodiments, but includes modifications and improvement as long as an object of the present invention can be achieved.

For instance, though the holding frame 80 is shaped in rectangular frame in the aforesaid embodiment, a protection frame having a front square C-shape may be used. In short, any arrangement of the holding frame is possible as long as the polarization converter 415 and the second lens array 416 are held and integrally secured.

Though the jig attachment hole 83 is formed on the upper side of the holding frame 80, the jig attachment hole may be formed on the side of the holding frame and any position is possible for the jig to be easily attached. Incidentally, the jig attachment hole is not requisite in the present invention and an arrangement of the holding frame having no jig attachment hole is included in the scope of the present invention. However, by forming the jig attachment hole, the holding frame can be easily always held at a constant attitude by the jig. At this time, the configuration of the jig attachment may be defined in any manner in implementation thereof, which is not restricted to the hole-shape.

Though the unit composed of the polarization converter 415 and the second lens array 416 is specifically described as the optical components being held by the holding frame 80, the optical components of the present invention is not restricted thereto. The optical components may be the dichroic mirror 421 and the condenser 417 etc., however, optical components requiring strict positioning such as the unit composed of the polarization converter 415 and the second lens array 416 are preferable.

Though a projector using three light modulators is described in the above embodiment, the present invention can be applied to a projector using a single light modulator, a projector using two light modulators and a projector using more than three light modulators. Further, though the liquid crystal panel is used as the light modulator in the above-described embodiment, a light modulator other than the liquid crystal such as a device using a micro-mirror can be used. Though transmission-type light modulator having light incident surface different from light irradiation surface is used in the aforesaid embodiment, a reflection-type light modulator having the same light incident surface and light irradiation surface may be used. Though an example of a projector for projecting the image from a direction for observing a screen is described in the aforesaid embodiment, the present invention can be also applied to a rear-type projector for projecting the image from a direction opposite to the direction for observing the screen.

Though the beam splitter of the aforesaid embodiment is composed of the first lens array 414 having matrix-shaped arrangement of lenses 414A with approximately rectangular contour, a rod may be used where a beam incident from an incident end from a light source is reflected to a plurality of reflection surfaces to be split into a plurality of partial light beam, thus irradiating from a irradiation end thereof.

What is claimed is:

1. A projector, comprising:
    a light source for irradiating a light;
    a beam splitter for splitting the light irradiated from the light source into a plurality of partial light beams;
    a polarization converter for converting the light beam irradiated from the beam splitter into a predetermined linear polarized light;
    a lens array including a matrix-shaped arrangement of a plurality of lenses for transmitting the plurality of partial light beams irradiated from the polarization converter to a light modulator;
    a holding frame for integrally fixing the polarization converter with the lens array; and
    a fixing portion of a support for supporting the holding frame, the holding frame having a fixing position that is adjustable relative to the fixing portion of the support.

2. The projector according to claim 1, a fixing position of the integrated polarization converter and the lens array being adjustable relative to the fixing portion of the support.

3. The projector according to claim 1, wherein the polarization converter having a polarization separation film and the pitch of the polarization separation film being twice as wide as the plurality of lenses of the lens array.

4. The projector according to claim 1, further comprising a guide engaging portion for guiding the holding frame to the fixing portion of the support is provided to the holding frame.

5. The projector according to claim 1, further comprising a jig engagement portion engageable with a position-adjusting jig for adjusting a fixing position of the holding frame.

6. The projector according to claim 1, the fixing position being adjustable both horizontally and vertically relative to the fixing portion of the support.

7. An optical device provided in a housing, comprising:
a polarization converter for converting a light beam into a predetermined linear polarized light;
a lens array for receiving the predetermined linear polarized light and the lens array having an optical axis direction; and
a holding frame that retains the polarization converter and lens array relative to one another and the holding frame is accommodated within the housing, the holding frame having horizontal and vertical adjustment guides to allow horizontal and vertical adjustment of the holding frame within the housing and also prevent movement in the optical axis direction.

8. The optical device according to claim 7, the vertical adjustment guide having an adhesive filling groove.

9. The optical device according to claim 7, further comprising clips that releasably attach the polarization converter and the lens array to the holding frame.

10. The optical device according to claim 9, the holding frame having a jig engaging portion that allows the holding frame to be positioned and adjusted within the housing.

11. The optical device according to claim 10, the jig engaging portion being located on an outer periphery of the holding frame.

12. An optical device provided in a housing, comprising:
a polarization converter for converting a light beam into a predetermined linear polarized light;
a lens array for receiving the predetermined linear polarized light; and
a holding frame that releasably retains the polarization converter and lens array relative to one another, the holding frame being housed within the housing, including a jig engaging portion to allow the holding frame position to be adjusted with the housing and including an outer periphery having horizontal and vertical adjustment guides that allow the jig engaging portion to adjust the holding frame when inserted within the housing.

13. The optical device according to claim 12, the horizontal and vertical adjustment guides preventing movement of the holding frame in the optical axis direction.

14. An optical device provided in a housing, comprising:
a polarization converter for converting a light beam into a predetermined linear polarized light;
a lens array for receiving the predetermined linear polarized light; and
a holding frame that releasably retains the polarization converter and lens array relative to one another, the holding frame being housed within the housing, including a jig engaging portion to allow the holding frame position to be adjusted with the housing and including a vertical adjustment guide having an adhesive filling groove.

15. An optical device provided in a housing, comprising:
a polarization converter for converting a light beam into a predetermined linear polarized light;
a lens array for receiving the predetermined linear polarized light; and
a holding frame that releasably retains the polarization converter and lens array relative to one another, the holding frame being housed within the housing and including a jig engaging portion to allow the holding frame position to be adjusted with the housing; and
clips that releasably attaches and allows adjustment of polarization converter and the lens array relative to one another.

16. A projector, comprising:
a housing;
a polarization converter for converting a light beam into a predetermined linear polarized light;
a lens array for receiving the predetermined linear polarized light and the lens array having an optical axis direction; and
a holding frame that retains the polarization converter and lens array relative to one another and the holding frame is accommodated within the housing, the holding frame having horizontal and vertical adjustment guides to allow horizontal and vertical adjustment of the holding frame within the housing and also prevent movement in the optical axis direction.

17. The projector according to claim 16, the vertical adjustment guide having an adhesive filling groove.

18. The projector according to claim 16, further comprising clips that releasably attach the polarization converter and the lens array to the holding frame.

19. The projector according to claim 16, the holding frame having a jig engaging portion that allows the holding frame to be positioned and adjusted within the housing.

20. The projector according to claim 19, the jig engaging portion being located on an outer periphery of the holding frame.

21. A projector, comprising:
a housing;
a polarization converter for converting a light beam into a predetermined linear polarized light;
a lens array for receiving the predetermined linear polarized light; and
a holding frame that releasably retains the polarization converter and lens array relative to one another, the holding frame being housed within the housing, including a jig engaging portion to allow the holding frame position to be adjusted with the housing and including an outer periphery having horizontal and vertical adjustment guides that allow the jig engaging portion to adjust the holding frame when inserted within the housing.

22. The projector according to claim 21, the horizontal and vertical adjustment guides preventing movement of the holding frame in the optical axis direction.

23. A projector, comprising:
a housing;
a polarization converter for converting a light beam into a predetermined linear polarized light;
a lens array for receiving the predetermined linear polarized light; and
a holding frame that releasably retains the polarization converter and lens array relative to one another, the holding frame being housed within the housing, including a jig engaging portion to allow the holding frame position to be adjusted with the housing and including a vertical adjustment guide having an adhesive filling groove.

24. A projector, comprising:

a housing;

a polarization converter for converting a light beam into a predetermined linear polarized light;

a lens array for receiving the predetermined linear polarized light;

a holding frame that releasably retains the polarization converter and lens array relative to one another, the holding frame being housed within the housing and including a jig engaging portion to allow the holding frame position to be adjusted with the housing; and clips that releasably attaches and allows adjustment of polarization converter and the lens array relative to one another.

* * * * *